United States Patent
Arnold

(10) Patent No.: US 9,448,724 B2
(45) Date of Patent: Sep. 20, 2016

(54) DYNAMICALLY CUSTOMIZABLE TOUCH SCREEN KEYBOARD FOR ADAPTING TO USER PHYSIOLOGY

(75) Inventor: Ryan S. Arnold, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 13/179,857

(22) Filed: Jul. 11, 2011

(65) Prior Publication Data
US 2013/0019191 A1   Jan. 17, 2013

(51) Int. Cl.
G06F 3/048   (2013.01)
G06F 3/0488   (2013.01)

(52) U.S. Cl.
CPC ................... G06F 3/04886 (2013.01)

(58) Field of Classification Search
CPC ............... G06F 3/0233; G06F 3/04886
USPC ....................................... 715/765
See application file for complete search history.

(56) References Cited

U.S. PATENT DOCUMENTS

| | | | | |
|---|---|---|---|---|
| 5,463,388 A | * | 10/1995 | Boie et al. | 341/33 |
| 2004/0046744 A1 | * | 3/2004 | Rafii et al. | 345/168 |
| 2005/0114115 A1 | * | 5/2005 | Karidis et al. | 704/10 |
| 2005/0122313 A1 | | 6/2005 | Ashby | |
| 2008/0100586 A1 | * | 5/2008 | Smart | 345/173 |
| 2011/0187647 A1 | * | 8/2011 | Woloszynski et al. | 345/168 |
| 2012/0036468 A1 | * | 2/2012 | Colley | G06F 3/0418 715/773 |
| 2012/0047454 A1 | * | 2/2012 | Harte | 715/773 |
| 2012/0075194 A1 | * | 3/2012 | Ferren | 345/168 |

OTHER PUBLICATIONS

Shneiderman, "Tree Visualization with Tree-Maps: 2-d Space-Filling Approach", ACM Transactions on Graphics, v. 11, n. 1, pp. 92-99, Jan. 1992.*
Sorrel, Charlie; "Resize, Split and Rotate iPad Keyboard? There's an App for That," May 19, 2010, http://www.wired.com/gadgetlab/2010/05/resize-split-and-rotate-ipad-keyboard-theres-an-app-for-that/.

* cited by examiner

*Primary Examiner* — Jennifer To
*Assistant Examiner* — Joseph R Burwell
(74) *Attorney, Agent, or Firm* — Middleton Reutlinger

(57) ABSTRACT

A touch screen keyboard is dynamically customizable to modify the active regions of one or more keys in the keyboard to adapt the keyboard to a user's unique physiology. The active regions may be modified in response to monitoring user input directed to the keys in the keyboard so that the keyboard automatically adapts to the user's physiology. In addition, while the locations and/or sizes of the active regions may be modified to adapt to a user's physiology, in some instances the shapes of the active regions may also be distorted such that the resulting active regions are irregular in nature.

19 Claims, 5 Drawing Sheets

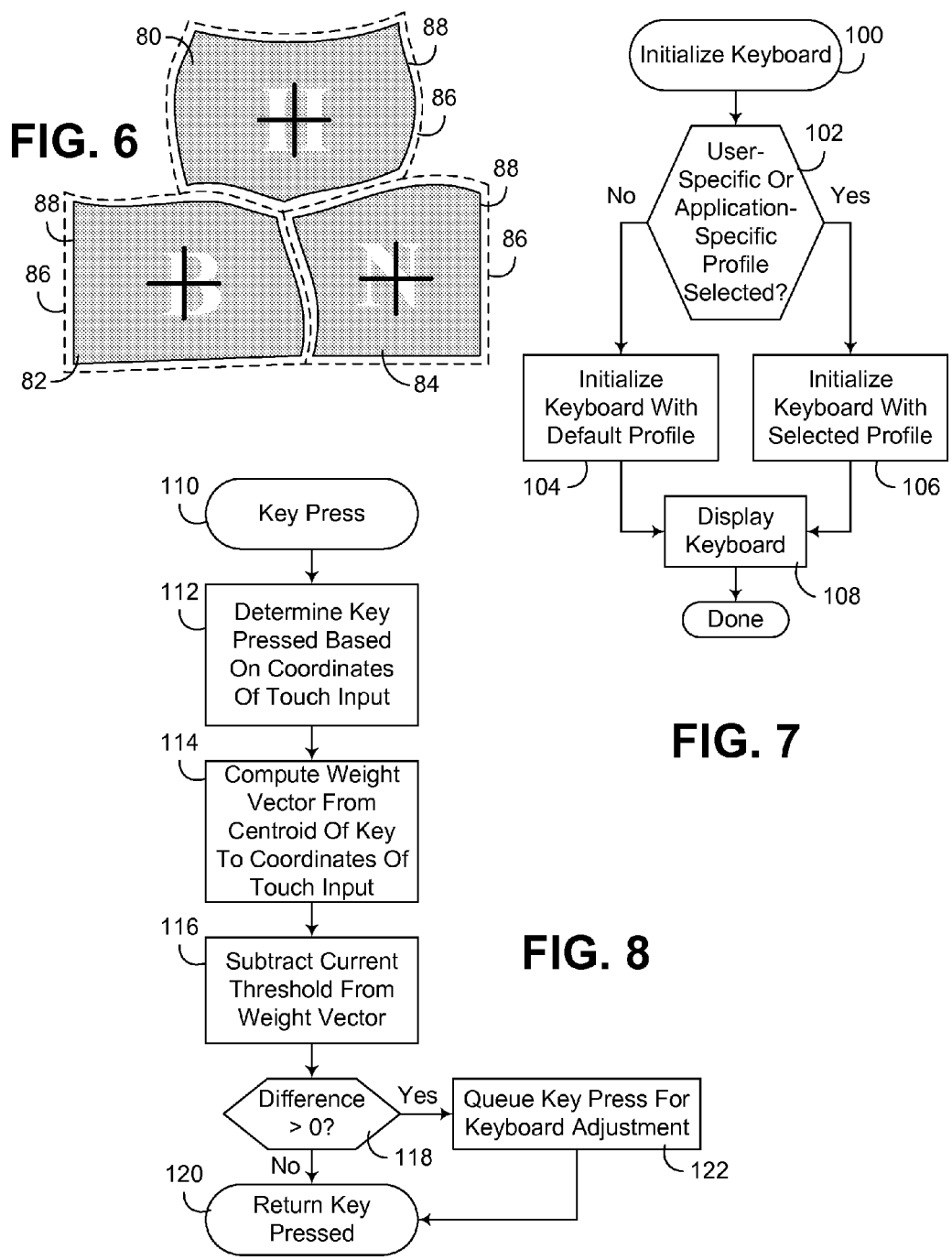

DYNAMICALLY CUSTOMIZABLE TOUCH SCREEN KEYBOARD FOR ADAPTING TO USER PHYSIOLOGY

FIELD OF THE INVENTION

The invention is generally related to computers and computer software, and in particular, to touch screen keyboard user interfaces.

BACKGROUND OF THE INVENTION

Keyboards, originally designed for typewriters, have long been a primary mechanism for receiving input from users of computers and other electronic devices. Originally, computer keyboards were predominantly mechanical devices that included arrays of physical keys that were triggered when depressed by users. A separate display such as a CRT monitor or LCD panel displayed information to the user, and the depression of keys resulted in the display of corresponding text characters on the display. Eventually computer keyboards were supplemented by pointing devices such as mice and track pads that controlled a movable pointer, enabling a user to "point and click" on graphical controls displayed on a display in order to perform desired operations on a computer.

More recently, however, touch screen displays have been developed, often eliminating the need for a separate physical keyboard and pointing device altogether. Touch screen displays, in particular, are finding uses in portable applications such as laptop computers, tablet computers, smartphones, and other mobile devices. Touch screen displays have the advantage of being highly intuitive as they enable a user to select operations simply by touching within an "active region" assigned to a displayed control (typically, a region that is closely aligned, if not identical, to the outer boundary of a displayed control).

Even as physical keyboards have been supplemented or supplanted by pointing devices and touch screen displays for much of the interaction between a user and a computer, keyboards remain popular because they are often the most efficient device for inputting textual information. As a result, even in portable electronic devices lacking physical keyboards, virtual keyboards are often displayed on touch screen displays to mimic the functionality of physical keyboards.

Virtual keyboards, however, are necessarily limited by the lack of a physical interaction between a user's fingers and the keys of a physical keyboard. Keys in a physical keyboard are typically raised from the surface of the keyboard housing, and may be indented and/or provided with protrusions so that a user can often subconsciously rely on their sense of touch to efficiently move their fingers to desired keys on the keyboard. Keyboards displayed on a touch screen display, in contrast, are displayed on a flat surface, and a user therefore cannot rely on their sense of touch to navigate their fingers between keys. As a result, virtual keyboards are typically subject to more erroneous inputs, often necessitating that a user either backup and re-type erroneous characters on a more frequent basis, or rely more on their sense of sight to ensure they touch in the proper locations on the display, both of which slow down user input and lead to less efficient user interaction.

Significant research has been focused on improving the ergonomics of physical keyboards, primarily due to overuse injuries such as carpal tunnel syndrome. The typewriter keyboard layout that is the de facto standard for most electronic devices, referred to as the QWERTY keyboard based upon the locations of the Q, W, E, R, T and Y keys at the top left of the keyboard, was originally developed to slow down typists who were able to type faster than early mechanical typewriters could handle, and ironically, much of the research subsequent to the adoption of QWERTY keyboards has been directed toward making QWERTY keyboards more efficient and comfortable for users. For example, ergonomic keyboard designs have been developed that separate the left and right halves of a keyboard and reorient them to place a user's wrists in a more natural orientation while typing. However, given that every user will have slightly different physiological characteristics, e.g., different finger and hand sizes and biomechanics, it remains difficult to design a keyboard that is optimally configured for all possible users.

Likewise, for touch screen keyboards, some efforts have been directed toward keyboard layouts that increase user comfort, efficiency and accuracy. For example, similar to some ergonomic physical keyboards, virtual keyboards have been developed with separate left and right groupings of keys. Furthermore, some virtual keyboards have been developed that permit groups of keys to be moved, resized and rotated by a user to position the keys in a comfortable location and orientation for a particular user.

In addition, some development efforts have been directed towards tracking user interaction with a virtual keyboard and adjusting the positions of keys based upon the user's interaction with the keyboard. The actual locations touched by users can be monitored and used to repositions of keys so that, for example, if a user consistently touches the A key in an upper left corner of the active region of the key, the key can be moved up and to the left so that the user's future touches will land closer to the center of the key, thereby minimizing the likelihood that the user misses the key in the future.

Despite these improvements, however, a substantial need continues to exist for a manner of improving the efficiency, comfort and accuracy of touch screen keyboards.

SUMMARY OF THE INVENTION

The invention addresses these and other problems associated with the prior art by providing a touch screen keyboard that is dynamically customizable to modify the active regions of one or more keys in the keyboard and thereby adapt the keyboard to a user's unique physiology. In some embodiments, the active regions may be modified in response to monitoring user input directed to the keys in the keyboard so that the keyboard automatically adapts to the user's physiology. In addition, in some embodiments the locations and/or sizes of the active regions may be modified to adapt to a user's physiology, while in other embodiments the shapes of the active regions may be distorted in addition to or in lieu of modifying the locations and/or sizes of the active regions such that the resulting active regions are irregular in nature.

Consistent with one aspect of the invention, a touch screen keyboard including a plurality of keys is displayed on a touch screen display, with each key including an active region that activates such key in response to user input directed to the touch screen display within such active region. User input directed to the plurality of keys is thereafter monitored, and the touch screen keyboard is dynamically customized by modifying a shape of the active region of at least one of the plurality of keys in response to the monitored user input.

Consistent with another aspect of the invention, a touch screen keyboard including a plurality of keys is displayed on a touch screen display, with each key including an active region that activates such key in response to user input directed to the touch screen display within such active region. The touch screen keyboard is dynamically customized by distorting shapes of the active regions of multiple keys from among the plurality of keys into irregular shapes to adapt to a user's physiology.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 graphically illustrates the keys of FIGS. 5A-5C after performing dynamic customization consistent with the invention.

FIG. 7 is a flowchart illustrating an exemplary sequence of operations for initializing the touch screen keyboard referenced in FIGS. 2-4.

FIG. 8 is a flowchart illustrating an exemplary sequence of operations for handling a key press operation for the touch screen keyboard referenced in FIGS. 2-4.

DETAILED DESCRIPTION

Figure 1:
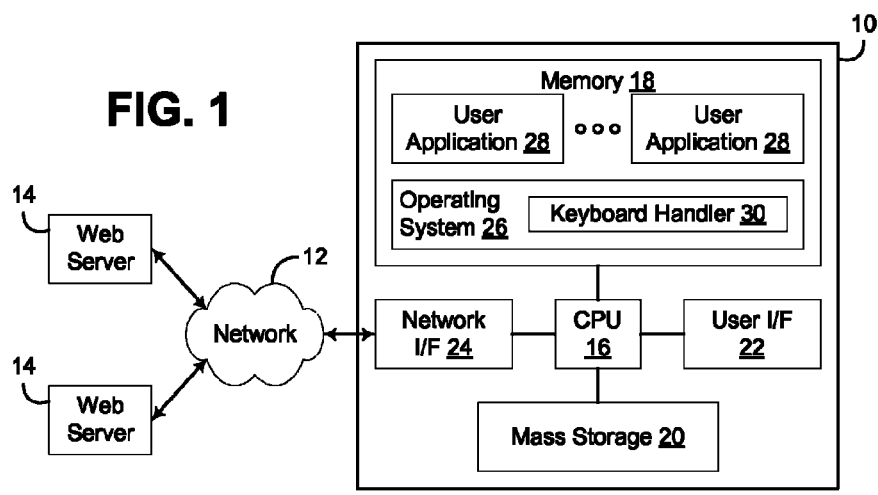
FIG. 1 is a block diagram of the principal hardware components in a tablet computer suitable for implementing a dynamically customizable touch screen keyboard consistent with the invention.

Embodiments consistent with the invention utilize a virtual keyboard displayed on a touch screen display, hereinafter referred to as a touch screen keyboard, that is dynamically customizable to modify the active regions of one or more keys in the keyboard and thereby adapt the keyboard to a user's unique physiology. In doing so, the accuracy, comfort and efficiency of the user's interaction with the keyboard is typically improved for individual users, and avoiding many of the compromises that would otherwise need to be made in order to provide acceptable performance for a wide range of potential users.

A touch screen keyboard consistent with the invention typically incorporates a plurality of graphical controls, or keys, arranged generally in close proximity with one another within an array. Each key is typically represented on the touch screen display by a graphical object, e.g., a filled or unfilled geometric shape that may optionally include a separate border, and which often, but not necessarily, includes an icon or label that uniquely identifies the key or otherwise indicates the function of the key. The outer boundary of the graphical object displayed for a key will be referred to herein as the display region for the key, and the visual depiction of the graphical object is also referred to herein as a visual element. Each key also includes an associated active region, which represents the area of the touch screen that, when touched by a user, will be detected and processed as depression or selection of the key by the user. An active region is also typically represented by a geometric shape that defines the positions on the touch screen that, when selected by a user, will activate the key.

In some embodiments, the active regions and display regions of keys will be coextensive with one another, and in some instances, active regions may not need to be separately defined from the display regions. In other embodiments, however, these regions may differ from one another. For example, in some applications keys are indicated only by their text labels, with no other graphical representation provided therefor. The active regions in such instances typically are defined as rectangular regions that provide a buffer of several pixels in each direction from the label. In other instances, adjacent keys may be visually separated by borders, and instead of ignoring touches to these borders, it may be desirable to expand the active regions of the adjacent keys into these borders so that any touches to these borders will be registered to the keys that are closest to the touches. Active regions may be defined in a number of manners consistent with the inventions, e.g., through definition of one or more coordinates and/or dimensions, or through definition by geometric equations capable of defining more complex regions.

Dynamic customization of a touch screen keyboard consistent with the invention typically incorporates modifying the shape of the active regions of one or more keys in the keyboard. A shape may be modified in a number of manners consistent with the invention, including resizing the shape (i.e., making the region larger or smaller but retaining the original shape geometry), distorting the shape, etc. Distortion of a shape as referred to herein may include any transformation of the active region that alters the original geometry of the shape, and may include scaling the region in one dimension to change its aspect or length/width ratio. Distortion of a shape may also include more complex distortions such as moving control points on Bezier, spline or other curves that represent the border of an active region. Furthermore, in some instances, distortion may include distorting the shape of a regular geometric object into an irregular geometric object. For example, a keyboard may include keys that are initially defined by regular objects such as squares, rectangles, squares/rectangles with rounded corners, ovals, circles, etc., and distortion of such objects may result in irregular shapes, e.g., with previously straight lines or arcs deformed into irregular or complex curves.

Additional modifications of active regions may also be performed in addition to shape modifications, e.g., transforming the position of an active region, rotating the active region, etc.

In addition, in some embodiments, the modifications of active regions may be performed automatically in response to monitoring of a user's interaction with a keyboard, e.g., by monitoring the exact positions of touches relative to the active regions of keys so that the active regions can be adjusted to center future touches to those keys within the active regions, thereby minimizing the risk that a user, intending to activate a certain key, will miss the key and activate an adjacent key. In other embodiments, users may be permitted to adjust the shapes of active regions manually, with the assistance of customization dialog boxes, wizards, or other controls conventionally used for controlling settings for a touch screen keyboard.

In still other embodiments, adjustments to the shapes of active regions of keys may be based upon key presses directed to other, adjacent keys. For example, in response to user depression of a key, followed by user depression of a correction key such as a backspace key or a delete key and user depression of another key that is adjacent to the initial key, an adjustment may be made to the shape of the active region of the second, adjacent key.

In other embodiments, adjustments to the shapes of active regions of keys may be based upon the detection of misspellings by a spell checker. For example, in response to detection of a misspelled word where at least one character in the word is associated with an adjacent key to that of the correct character, an adjustment may be made to the shape of the active region of the key(s) corresponding to the incorrect and/or correct characters.

Other variations and modifications will be apparent to one of ordinary skill in the art. Therefore, the invention is not limited to the specific implementations discussed herein.

Hardware and Software Environment

Turning now to the drawings, wherein like numbers denote like parts throughout the several views, FIG. 1 illustrates an apparatus 10 within which a dynamically customizable touch screen keyboard may be implemented. Apparatus 10 in the illustrated embodiment is implemented as a tablet computer that may be coupled via a network 12 to one or more other computers 14, e.g., web servers coupled over the Internet. For the purposes of the invention, computer 10 may represent practically any type of computer, computer system or other programmable electronic device incorporating a touch screen display, e.g., a desktop computer, a laptop computer, a handheld computer, a cell phone, a smart phone, a tablet computer, a portable navigation device, a gaming console, a gaming console controller, etc.

Computer 10 typically includes a central processing unit 16 including at least one hardware-based microprocessor coupled to a memory 18, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 18 may be considered to include memory storage physically located elsewhere in computer 10, e.g., any cache memory in a processor in CPU 16, as well as any storage capacity used as a virtual memory, e.g., as stored on a mass storage device 20 or on another computer coupled to computer 10. Computer 10 also typically receives a number of inputs and outputs for communicating information externally. For interface with a user or operator, computer 10 typically includes a user interface 22 incorporating one or more user input devices (e.g., a keyboard, a mouse, a trackball, a joystick, a touchpad, and/or a microphone, among others), a touch screen display (e.g., a CRT monitor, an LCD display panel, etc.), speakers, etc., headphone jacks, Otherwise, user input may be received via another computer or terminal.

For additional storage, computer 10 may also include one or more mass storage devices 20, e.g., a floppy or other removable disk drive, a hard disk drive, a direct access storage device (DASD), an optical drive (e.g., a CD drive, a DVD drive, etc.), a solid state storage drive (SSD), a storage area network, and/or a tape drive, among others. Furthermore, computer 10 may include an interface 24 with one or more networks 12 (e.g., a LAN, a WAN, a wireless network, and/or the Internet, among others) to permit the communication of information with other computers and electronic devices. It should be appreciated that computer 10 typically includes suitable analog and/or digital interfaces between CPU 16 and each of components 18, 20, 22 and 24 as is well known in the art. Other hardware environments are contemplated within the context of the invention.

Computer 10 operates under the control of an operating system 26 and executes or otherwise relies upon various computer software applications, components, programs, objects, modules, data structures, etc., as will be described in greater detail below (e.g., user applications 28 and a keyboard handler 30). Moreover, various applications, components, programs, objects, modules, etc. may also execute on one or more processors in another computer coupled to computer 10 via network 12, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include tangible, recordable type media such as volatile and non-volatile memory devices (e.g., memory 18), floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Dynamically Customizable Touch Screen Keyboard

Figure 2:
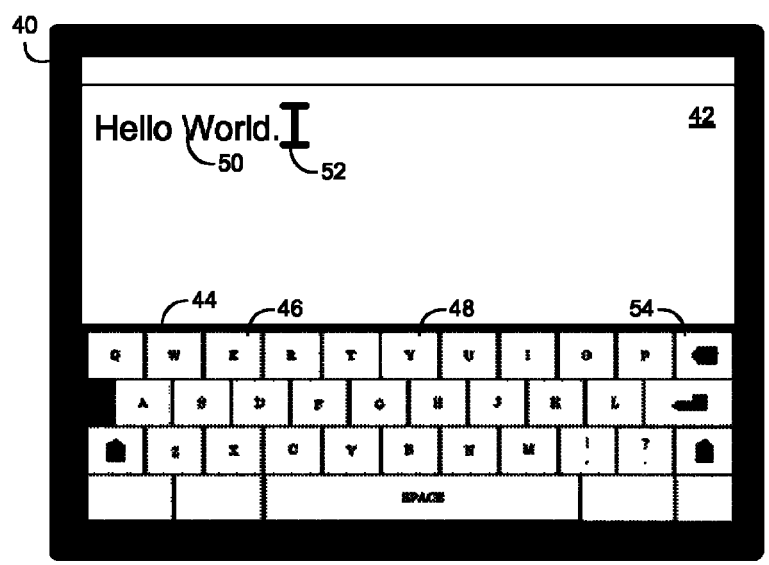
FIG. 2 is a top plan view of the tablet computer of FIG. 1, illustrating a touch screen keyboard displayed on a display thereof.

Turning now to FIG. 2, this figure illustrates an implementation of the invention in a tablet computer 40, which includes a touch screen display 42 with a virtual keyboard 44 displayed thereon. Keyboard 44 includes a plurality of keys 46, including both typographic keys 48, which cause text, e.g., text 50 to be displayed at a position defined by a cursor 52, and control keys 54, which are used to perform various functions, e.g., to move cursor 52, change typographic keys 48 to display numbers or other characters, etc.

Figure 3:
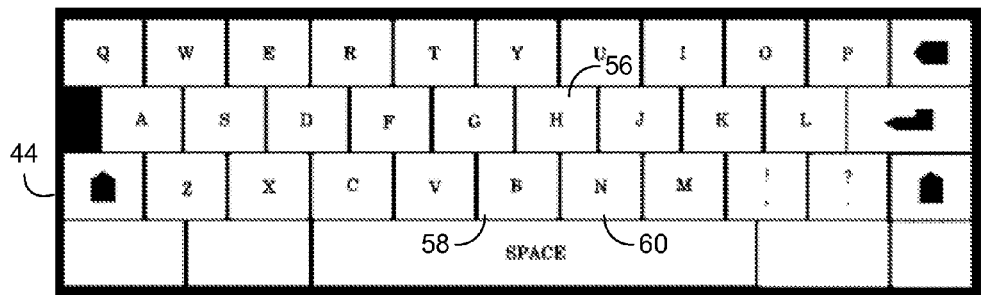
FIG. 3 illustrates an initial state of the touch screen keyboard referenced in FIG. 2.

Embodiments of the invention provide a way to dynamically customize a touch screen keyboard using a user feedback loop such that the keyboard better fits a user's physiology. As shown in FIG. 3, keys in keyboard 44 are typically defined with an initial position defined by a bounding shape, here a rectangle, by default. For the purposes of this example, focus will be on the "H", "B" and "N" keys 56, 58 and 60, which as shown in FIG. 3 are initially rectangular in shape. Furthermore, for the purposes of this example, each key has an active region that is coextensive with the display region of the key, and as such, each key 56-60 has a display region and an active region that are initially rectangular in shape.

Figure 4:
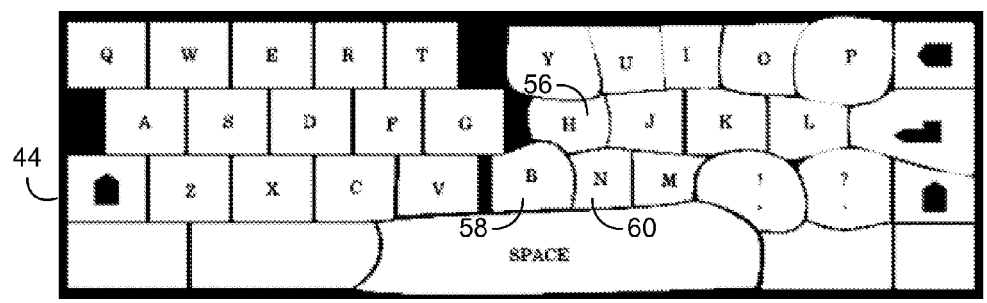
FIG. 4 illustrates a subsequent state of the touch screen keyboard of FIG. 3 after performing dynamic customization consistent with the invention.

In this exemplary embodiment, user input directed to the keyboard is monitored and used as a feedback loop to dynamically modify the shapes of one or more keys in keyboard 44. As the user touches a key, depending on the location of the press, the key's display/active region migrates in that direction such that the user will eventually press the target key somewhere within an acceptability threshold and the key's display/active region stabilizes. Moreover, since keys in a keyboard are typically arranged in close proximity to one another, the modification of the shape of one key will typically affect the shapes of adjacent keys. Therefore, as shown in FIG. 4, keyboard 44, after monitoring user input for a particular user, may be dynamically customized for that particular user, resulting in a key layout that has been optimized for that user's particular physiology.

Figures 5A, 5B, 5C:
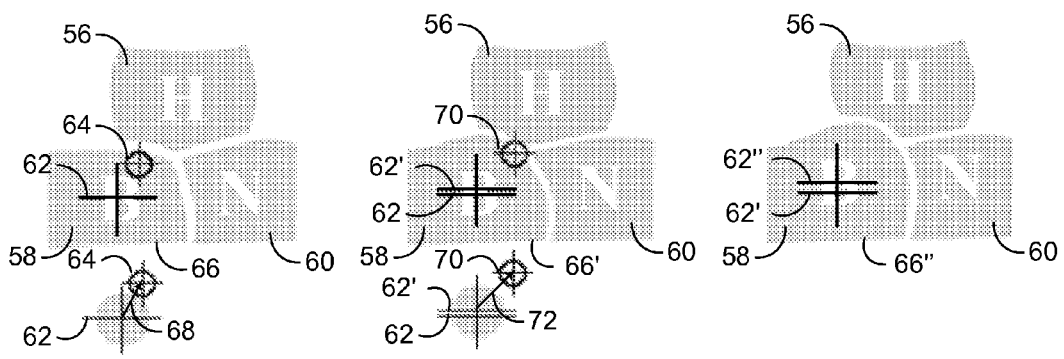
FIGS. 5A-5C graphically illustrate dynamic modification of the shapes of multiple keys from the touch screen keyboard of FIGS. 2-4.

FIGS. 5A-5C, for example, illustrate the dynamic modification of the shape of a key 58 in response to user input. As shown in FIG. 5A, key 58 may include a centroid 62 defining the geometric center of the key. If, for example, a user attempts to depress key 58 with a touch represented at 64 in FIG. 5A, analysis of touch 64 would determine first that key 58 has been depressed as a result of touch 64 being within an active region 66 of key 58. Second, the position of touch 64 relative to centroid 62 may also be determined, e.g., by computing a weight vector 68 that starts at the current centroid of key 58 and ends at the center of touch 64. Based upon weight vector 68, the shape of active region 66 may be modified, e.g., as shown at 66' in FIG. 5B. In addition, as a result of the modification of the shape, the centroid of key 58 migrates to the position represented at 62'. Furthermore, the shapes of the active regions of keys 56 and 60 may also be modified to accommodate the modification to key 58. In this example, the shape of key 58 is enlarged along the direction of vector 68 extending from centroid 62 to touch 64.

In addition, in some embodiments, the weight vector may be tested against a threshold prior to attempting shape modification so that any touches within a certain radius of the centroid will not invoke shape modification. It will be appreciated that by controlling the threshold, the frequency of touches that invoke shape modification may be varied so that a keyboard is easier or harder to modify. In some instances, for example, it may be desirable to set a relatively low threshold until the user is satisfied with the keyboard layout, whereby the user can raise the threshold, or turn off dynamic customization entirely so that the keyboard is no longer modified in response to normal user interaction with the keyboard.

As also shown in FIG. 5B, a subsequent touch 70, which would not have been registered as a touch to key 58 when active region 66 of key 58 was defined as shown in FIG. 5A, is within active region 66' and thus registered as a depression of key 58. Again, a weight vector 72 is calculated between touch 70 and centroid 62', and as a result, the shape of the active region of key 58 is again modified, e.g., as shown at 66'' in FIG. 5C. Moreover, the centroid has again migrated to position 62'', and adjacent keys 56 and 60 have also been modified to accommodate the modification to key 58.

As noted above, each key may have coextensive display and active regions. In the alternative, as illustrated in FIG. 6, keys 80, 82 and 84 may have active regions 86 that are larger than associated display regions 88, thereby providing a visual separation between the displayed portions of the keys, but still enabling touches between the displayed portions of the keys to register as key presses.

FIGS. 7-10 next illustrate a set of routines that may be executed by a software program, e.g., keyboard handler 30, to support dynamic customization of a touch screen keyboard in a manner consistent with the invention.

FIG. 7, for example, illustrates an initialize keyboard routine 100 that may be executed whenever a keyboard is to be displayed on a touch screen display (e.g., in response to a user touching within a text box). Routine 100 begins in block 102 by determining whether the user has selected a user-specific or application-specific profile. In particular, in some embodiments it may be desirable to save keyboard profiles so that different keyboard layouts can be displayed in different circumstances. For example, where a computer is used by multiple users, different users may have customized keyboards adapted for their particular physiology, so block 102 may determine what user is currently logged into the computer and select the keyboard profile associated with that user. In the alternative, different profiles may be defined for different applications, e.g., to accommodate different usages of particular keyboards by a user when interacting with different applications. Furthermore different profiles may be defined for landscape and portrait oriented keyboards, since the geometries of keyboards in portrait or landscape orientations are often substantially different and will typically affect users differently. In other embodiments, no profiles may be used.

If profiles are not used, or if no profiles are saved, block 102 passes control to block 104 to initialize the keyboard with a default profile (e.g., the profile illustrated in FIG. 3). Otherwise, block 102 passes control to block 106 to initialize the keyboard with the selected profile. Once the keyboard is initialized with a profile, control passes to block 108 to display the keyboard on the touch screen display with the layout defined by the selected profile.

FIG. 8 next illustrates a key press handler routine 110, which is invoked in response to a touch to the touch screen display within the boundary of the keyboard. Routine 110 begins in block 112 by determining the key pressed as a result of the touch, based upon the coordinates of the touch input and the active regions of the various keys in the keyboard. Block 114 then computes a weight vector from the centroid of the depressed key to the coordinates of the touch input, and block 116 subtracts the current threshold from the weight vector computed in block 114, and block 118 determines whether the difference is greater than zero (alternatively, the weight vector can be compared with the threshold to see if it is greater than the threshold).

If not, control passes to block 120, where the selected key is returned and further processing consistent with the particular key selected is handled in a conventional manner. If, however, the threshold has been exceeded, block 118 passed control to block 122 prior to returning the key pressed to queue the key press for later keyboard adjustment. By queuing the key press rather than immediately adjusting the keyboard, keyboard adjustment can be deferred to times of inactivity so that the responsiveness of the keyboard is not compromised.

Figure 9:
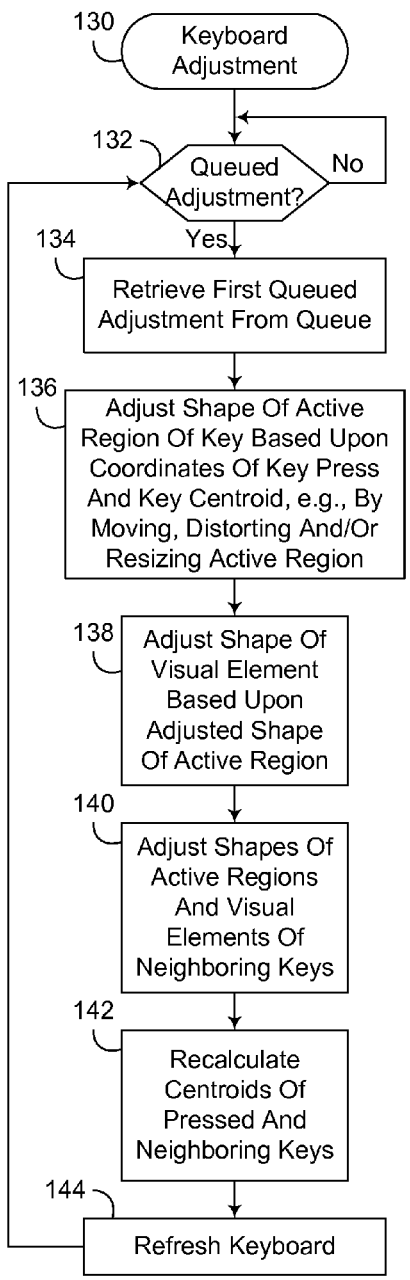
FIG. 9 is a flowchart illustrating an exemplary sequence of operations for dynamically adjusting the touch screen keyboard referenced in FIGS. 2-4.

FIG. 9 illustrates a keyboard adjustment routine 130 that is configured to process the key presses queued in routine 110. Block 132 checks whether any adjustments/key presses are queued, and once a queued adjustment/key press is detected, block 132 passes control to block 134 to retrieve the first queued adjustment from the queue. Block 136 then adjusts/modifies the shape of the active region of the pressed key based upon the coordinates of the key press and the centroid of the pressed key. Adjustment/modification of the shape often includes transforming the shape in such a manner that the geometry of the shape is modified (i.e., more than merely resizing the shape so that the underlying geometry does not change), but in some embodiments may involve merely resizing the shape in one or more dimensions. Modification of a shape may also include more complex distortions such as moving control points on Bezier, spline or other curves that represent the border of an active region, and may involve distorting the shape of a regular geometric object into an irregular geometric object (e.g., as is the case with the initially rectangular keys in keyboard FIG. 3 that are distorted into complex shapes as shown in FIG. 4). Additional modifications of active regions may also be performed in addition to shape modifications, e.g., transforming the position of an active region, rotating the active region, etc. For example, it may be desirable in some instances to recompute the position of an active region of a key after the shape has been modified.

Moreover, the amount of adjustment may be variable in some embodiments. For example, the amount of adjustment may be based on the length of the weight vector so that key presses that fall farther from the centroid cause larger changes than those that are relatively close to the centroid. In the alternative, the amount of adjustment may be fixed, e.g., a fixed percentage, or may be configurable via a setting so that the keyboard will change more rapidly or slowly based on user preference.

In one embodiment, it may be desirable to modify the shape of an active region by "growing" a key in the direction of a weight vector and essentially enlarge the key along that direction so that future key presses will be closer to the centroid of the key. Thus, the active region of a key may be enlarged along a direction of a vector extending from a centroid of the shape of the active region of a key to a position of user input directed to the active region. Adjacent keys may also be modified by compressing their active regions along the same vector to accommodate the growth of the pressed key along the vector.

Next, in block 138, the shape of the visual element for the key, i.e., the display region, is adjusted based on the adjusted shape of the active region of the key, e.g., to apply a border around the key. In some embodiments, the display and active regions may be combined, and as such, a separate block 138 is not required.

Next, block 140 adjusts the shapes of the active and display regions of neighboring keys in the keyboard, and block 142 recalculates the centroids of the pressed and neighboring keys. Block 144 then refreshes the display of the keyboard of the touch screen display, and returns control to block 132 to process any remaining queued adjustments.

As noted above, it may be desirable in some instances to enable/disable or otherwise change the feedback loop to provide for a keyboard that is more or less dynamic in response to user input. The changes may be performed via configuring user settings in any number of manners that would be apparent to one of ordinary skill in the art having the benefit of the instant disclosure.

Figure 10:
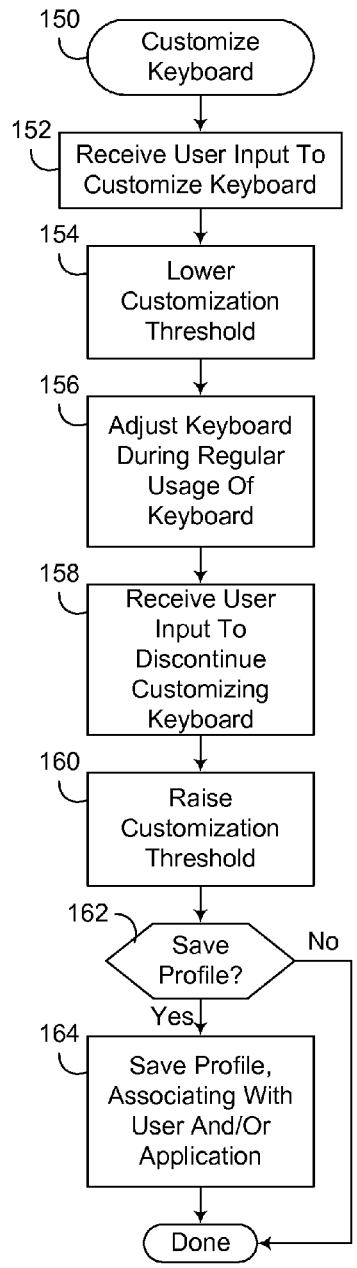
FIG. 10 is a flowchart illustrating an exemplary sequence of operations performed in response to a user request to dynamically customize the touch screen keyboard referenced in FIGS. 2-4.

As shown in FIG. 10, for example, a keyboard may be dynamically customized by a routine 150 that begins in block 152 by receiving user input to customize the keyboard. In response, block 154 lowers the customization threshold to a value that adjusts the shapes of keys in response to touches falling outside a relatively small radius from the centroid of each key. Block 156 then adjusts the keyboard, e.g., using routines 110 and 130, during regular usage of the keyboard. At some point thereafter, the user may be satisfied with the layout of the keyboard, and block 158 detects user input to discontinue customizing the keyboard, and block 160 raises the customization threshold to a value that either disables customization entirely or limits customization only to touches outside of a relatively large radius (i.e., proximate the borders of keys only). Block 162 then optionally determines whether the new keyboard layout should be saved as a new profile associated with the user and/or an application, and if so, saves the profile in block 164. Once the profile is saved, or if the profile is not to be saved, routine 150 is complete.

In addition, in some embodiments it may be desirable to adjust the shape of an active region of a key based upon a key press directed to another, adjacent key. For example, if a user depresses the "G" key when intending to depress the "F" key of a QWERTY keyboard, the shape of the active region of the "F" key may be adjusted, rather than that of the "G" key, whenever it can be determined that the user likely intended to hit the "F" key in the first place. For example, some embodiments may track sequences of key depressions and/or the depression of a correction key such as a backspace key or a delete key. If, for example, a user depresses the "G" key, followed by the backspace key and then the "F" key, a strong likelihood exists that the user originally intended to hit the "F" key.

Figure 11:
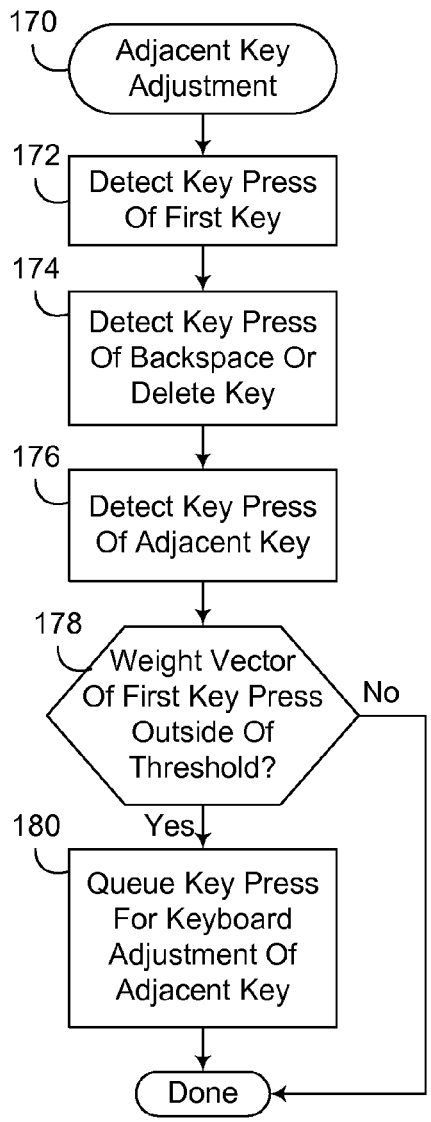
FIG. 11 is a flowchart illustrating an exemplary sequence of operations for adjusting an adjacent key for the touch screen keyboard referenced in FIG. 2-4.

Thus, in some embodiments, in response to user depression of a key, followed by user depression of a correction key such as a backspace key or a delete key and user depression of another key that is adjacent to the initial key, an adjustment may be made to the shape of the active region of the second, adjacent key, rather than the initial key. FIG. 11 illustrates an adjust adjacent key routine 170 capable of implementing such functionality. Routine 170 detects a key press of a first key (block 172), followed by a key press of a correction key (e.g., a backspace key or delete key) (block 174) and a key press of an adjacent key, i.e., a key that is adjacent to the first key (block 176). Next, block 178 calculates the weight vector for the first key press and determines whether the weight vector was outside of the threshold for the first key, and thus relatively close to the boundary between the active regions of the first and adjacent keys. If so, a key adjustment can be queued for the adjacent key, rather than the first key, so block 178 passes control to block 180 to queue the key press. Otherwise, block 178 bypasses block 180, and routine 170 is complete.

It will be appreciated that routine 170 may be implemented in a number of manners consistent with the invention, e.g., by maintaining a log of key presses and the actual locations of the touches corresponding to those key presses. In addition, it may be desirable to defer or undo prior adjustments applied to the first key, e.g., so that the initial key press directed to the first key will not cause the shape of the active region of the first key to be adjusted in a manner that effectively negates the adjustment of the adjacent key.

It may also be desirable to adjust the shape of an active region of a key based upon detected misspellings, e.g., as detected by a spell checker. For example, if a user types the word "garafe" when intending to type the word "garage," the shape of the active regions of the "F" and/or "G" keys may be adjusted to minimize the likelihood of further misspellings of the word.

Figure 12:
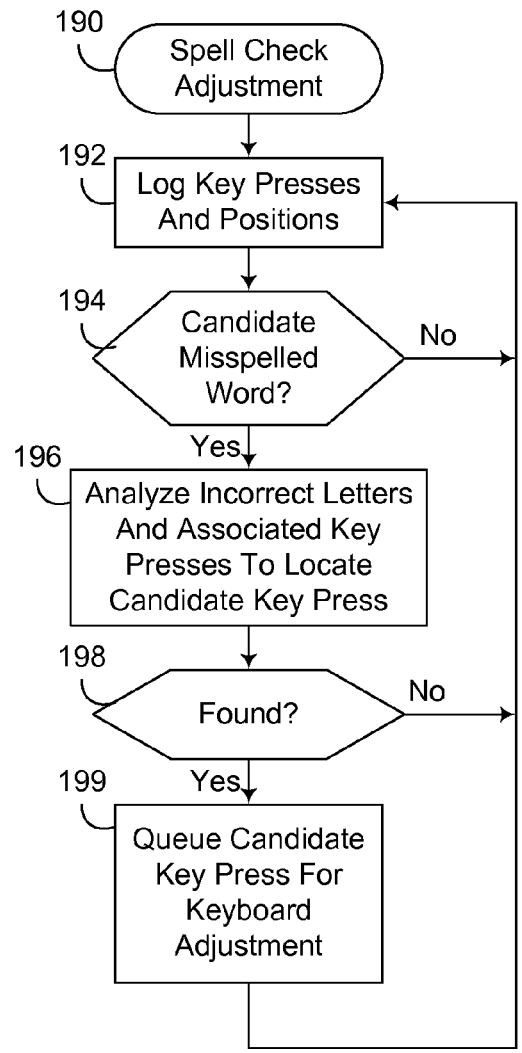
FIG. 12 is a flowchart illustrating an exemplary sequence of operations for performing a spell check adjustment with the touch screen keyboard referenced in FIG. 2-4.

Thus, in response to detection of a misspelled word where at least one character in the word is associated with an adjacent key to that of the correct character, an adjustment may be made to the shape of the active region of the key(s) corresponding to the incorrect and/or correct characters. As shown in FIG. 12, for example, a spell check adjustment routine 190 may log key presses and positions in block 192 and detect a misspelled word in block 194 (returning control to block 192 if no misspelled word is detected). Block 194 may also filter out misspelled words that do not meet other conditions. For example, it may be desirable to limit the spell check adjustment to misspelled words that have been corrected by a user (either on-the-fly or in a later spell check operation) or corrected as a result of an auto-correct operation. It further may be desirable to limit the spell check adjustment to subsets of corrected misspelled words that were likely misspelled due to typing issues as opposed to a user not knowing the correct spelling, e.g., words that have only a single incorrect character and/or that have incorrect characters that correspond to keys that are located adjacent to the keys for the corresponding characters in the corrected spelling. In some instances, it may also be desirable to include misspelled words that have not been corrected, but are otherwise determined to have a relatively high probability of being misspelled due to typing issues, e.g., where a word has a single, most likely corrected spelling, and that correct spelling differs from the misspelling only by a single character that corresponds to a key that is located adjacent to the key for the corresponding character in the corrected spelling.

Next, for any detected misspelled word, block 194 passes control to block 196 to analyze the incorrect letter(s) in the word and the associated key presses to locate one or more candidate key presses—i.e., key presses that, based upon the coordinates of the associated touches, were likely intended for adjacent keys. Block 198 determines whether any such candidate key presses were found, and if so, passes control to block 199 to queue the candidate key press for keyboard adjustment, e.g., to adjust the active regions of a mishit key or the originally intended key so that future misspellings of this nature will be minimized. If no such candidate key press is found, or after the candidate key press has been queued, control returns to block 192 to continue logging key presses and waiting for misspelled words.

Therefore, it can be seen that embodiments consistent with the invention improve the accuracy, efficiency and comfort for a touch screen keyboard for individual users through dynamic modification of the shapes of keys and in response to user interaction with the keyboard. In addition, embodiments of the invention may also provide accessibility improvements for physically challenged users, e.g., to provide a more condensed keyboard for a typist with a single hand. Various modifications may be to the illustrated embodiments consistent with the invention. For example, in some embodiments, dynamic customization can be processed concurrently with registering key presses. In other embodiments, however, modifications to active regions may be queued for later modification to ensure that key depressions are handled in a timely and efficient manner. In addition, in some embodiments, the user feedback loop may be toggled off or on depending on whether the user feels they've achieved a desirable and efficient layout. Additionally the threshold can be increased such that only very strong deviations would result in modifications.

In still other embodiments, user feedback may be supplemented with or substituted with manual modification. Various graphical tools may be used to enable a user to manually manipulate the active regions and/or display regions of keys to suit his or her personal preference.

Various additional modifications may be made without departing from the spirit and scope of the invention. Therefore, the invention lies in the claims hereinafter appended.

What is claimed is:

1. A method of configuring a touch screen keyboard, the method comprising:
    displaying a touch screen keyboard including a plurality of keys on a touch screen display, each key including an active region that activates such key in response to user input directed to the touch screen display within such active region, wherein displaying the touch screen keyboard includes arranging the plurality of keys into an array having a predetermined arrangement;
    monitoring user input directed to the plurality of keys, including determining a position of a touch associated with a first key press;
    determining a first key among the plurality of keys that is pressed based upon the position of the touch and the active region of at least one of the plurality of keys;
    determining a direction from a centroid of the active region of the first key to the position of the touch; and
    dynamically customizing the touch screen keyboard while maintaining the predetermined arrangement of the plurality of keys by modifying a shape of the active region of the first key in response to the monitored user input and based upon the position of the touch relative to the active region of the first key, wherein modifying the shape of the active region of the first key includes enlarging the active region of the first key in the determined direction while maintaining a relative arrangement of the first key to any adjacent key among the plurality of keys in the predetermined arrangement;
    wherein dynamically customizing the touch screen keyboard includes determining a distance between a coordinate of a key press by a user and a centroid defined for an active region of the first key during user selection of the first key and modifying the shape of the active region of the first key in response to the distance exceeding a threshold; and wherein the method further includes modifying the threshold in response to user input by increasing the threshold once a user has customized the touch screen keyboard to the user's liking to restrict future customizations of the touch screen keyboard.

2. The method of claim 1, wherein monitoring the user input includes monitoring user input during regular usage of the touch screen keyboard.

3. The method of claim 1, wherein modifying the shape of the active region comprises resizing the active region.

4. The method of claim 1, wherein modifying the shape of the active region comprises distorting the shape of the active region into an irregular shape.

5. The method of claim 1, wherein modifying the shape of the active region further includes moving a centroid of the shape of the active region.

6. The method of claim 1, wherein each of the plurality of keys includes a displayed visual element based upon the active region thereof, and wherein dynamically customizing the touch screen keyboard further includes modifying a shape of the displayed visual element based upon the modified shape of the active region.

7. The method of claim 1, wherein dynamically customizing the touch screen keyboard further includes modifying the active region of a second key among the plurality of keys and disposed adjacent the first key in the predetermined arrangement to accommodate the modification of the shape of the active region of the first key.

8. The method of claim 7, wherein modifying the active region of the second key includes at least one of moving the active region of the second key and resizing the active region of the second key.

9. The method of claim 7, wherein modifying the active region of the second key includes distorting the shape of the active region of the second key into an irregular shape.

10. The method of claim 7, wherein modifying the active region of the second key includes compressing the active region along the determined direction while maintaining a relative arrangement of the first and second keys in the predetermined arrangement.

11. The method of claim 1, wherein the plurality of keys are initially defined with active regions having generally rectangular shapes, and wherein dynamically customizing the touch screen keyboard includes distorting the shapes of the active regions of at least a subset of the plurality of keys such that the active regions of the keys in the subset are non-rectangular.

12. The method of claim 1, wherein the user input to modify the threshold includes user input to discontinue customization of the touch screen keyboard.

13. The method of claim 1, wherein dynamically customizing the touch screen keyboard includes generating a first keyboard profile, the method further comprising:

dynamically customizing the touch screen keyboard in response to monitored user input to generate a second keyboard profile; and switching between the first and second keyboard profiles.

14. The method of claim 1, wherein dynamically customizing the touch screen keyboard includes modifying the active region of the first key in response to monitored user input directed to the active region for a second key among the plurality of keys and disposed adjacent to the first key in the predetermined arrangement.

15. The method of claim 1, wherein dynamically customizing the touch screen keyboard includes modifying the active region of the first key in response to monitored user input directed to a correction key.

16. The method of claim 15, wherein monitoring user input directed to the plurality of keys includes monitoring user input directed to the plurality of keys to detect a predetermined sequence of user input directed to a second key among the plurality of keys that is adjacent to the first key in the predetermined arrangement, followed by user input directed to a correction key, followed by user input directed to the first key, and wherein dynamically customizing the touch screen keyboard includes modifying the active region of the first key in response to detecting the predetermined sequence.

17. The method of claim 1, wherein dynamically customizing the touch screen keyboard includes modifying the active region of the first key in response to detection of a misspelled word.

18. An apparatus, comprising:

at least one processor; and program code configured to be executed by the at least one processor to display a touch screen keyboard including a plurality of keys on a touch screen display, each key including an active region that activates such key in response to user input directed to the touch screen display within such active region, the program code configured to arrange the plurality of keys in the touch screen keyboard into an array having a predetermined arrangement, the program code further configured to monitor user input directed to the plurality of keys by determining a position of a touch associated with a first key press, determine a first key among the plurality of keys that is pressed based upon the position of the touch and the active region of at least one of the plurality of keys, determine a direction from a centroid of the active region of the first key to the position of the touch, and dynamically customize the touch screen keyboard while maintaining the predetermined arrangement of the plurality of keys by modifying a shape of the active region of the first key in response to the monitored user input and position of the touch relative to the active region of the first key, and wherein the program code is configured to modify the shape of the active region of the first key by enlarging the active region of the first key in the determined direction while maintaining a relative arrangement of the first key to any adjacent key among the plurality of keys in the predetermined arrangement;

wherein the program code is further configured to dynamically customize the touch screen keyboard by determining a distance between a coordinate of a key press by a user and a centroid defined for an active region of the first key during user selection of the first key and modifying the shape of the active region of the first key in response to the distance exceeding a threshold; and wherein the program code is further configured to modify the threshold in response to user input by increasing the threshold once a user has customized the touch screen keyboard to the user's liking to restrict future customizations of the touch screen keyboard.

19. The apparatus of claim 18, wherein the program code is configured to monitor user input during regular usage of the touch screen keyboard, and wherein the program code is configured to modify the shape of the active region by performing at least one of resizing the active region and distorting the shape of the active region.

\* \* \* \* \*